United States Patent
Nolan et al.

(10) Patent No.: US 10,981,412 B2
(45) Date of Patent: Apr. 20, 2021

(54) INLET SHEET FOR A BOOK-LIKE ELECTRONIC IDENTIFICATION DOCUMENT

(71) Applicant: HID Global Ireland Teoranta, Baile Na HabHann (IE)

(72) Inventors: Frank Nolan, Galway (IE); Mike McKeon, Galway (IE)

(73) Assignee: HID Global Ireland Teoranta, Baile Na HabHann (IE)

( * ) Notice: Subject to any disclaimer, the term of this patent is extended or adjusted under 35 U.S.C. 154(b) by 0 days.

(21) Appl. No.: 16/755,909

(22) PCT Filed: Oct. 16, 2018

(86) PCT No.: PCT/EP2018/078188
§ 371 (c)(1),
(2) Date: Apr. 14, 2020

(87) PCT Pub. No.: WO2019/076863
PCT Pub. Date: Apr. 25, 2019

(65) Prior Publication Data
US 2020/0316984 A1    Oct. 8, 2020

(30) Foreign Application Priority Data
Oct. 17, 2017   (EP) .................................. 17196931

(51) Int. Cl.
*B42D 25/24* (2014.01)
*B42D 25/45* (2014.01)
(Continued)

(52) U.S. Cl.
CPC ......... *B42D 25/45* (2014.10); *G06K 19/0723* (2013.01); *B42D 25/23* (2014.10);
(Continued)

(58) Field of Classification Search
CPC ............................... B42D 25/24; B42D 25/45
See application file for complete search history.

(56) References Cited

U.S. PATENT DOCUMENTS 7,758,079 B2 * 7/2010 Beyer-Meklenburg ......................
B42D 25/41
283/75
8,517,427 B2 * 8/2013 Herlin .................. B42D 25/328
283/98
(Continued)

FOREIGN PATENT DOCUMENTS

AR       113321 A1    4/2020
CN    101010205 A    8/2007
(Continued)

OTHER PUBLICATIONS

JP-2018187839-A English Translation (Year: 2017).*
(Continued)

*Primary Examiner* — Kyle R Grabowski
(74) *Attorney, Agent, or Firm* — Schwegman Lundberg & Woessner, P.A.

(57) ABSTRACT

An inlay sheet for a book-like identification document. The inlet sheet may include a first hinge layer comprising polycarbonate and a second hinge layer comprising a flexible material different to polycarbonate, e.g. PET, polyurethane, fabric, mesh. The second hinge layer is attached to the first hinge layer. A first datapage layer and a second datapage layer are attached to the first hinge layer and the second hinge layer, respectively, such that the first and second hinge layers are positioned between the first and second datapage layers for forming a datapage section having a datapage thickness. The first and second datapage layers form a common datapage inner front edge and the first and second hinge layers extend beyond the common datapage inner
(Continued)

front edge such that a hinge section is formed having a hinge thickness smaller than the datapage thickness.

16 Claims, 3 Drawing Sheets

(51) Int. Cl.
    *G06K 19/07*     (2006.01)
    *B42D 25/23*     (2014.01)
    *B42D 25/41*     (2014.01)
    *B42D 25/435*     (2014.01)

(52) U.S. Cl.
    CPC .............. *B42D 25/24* (2014.10); *B42D 25/41* (2014.10); *B42D 25/435* (2014.10)

(56) References Cited

U.S. PATENT DOCUMENTS

| | | |
|---|---|---|
| 2008/0169638 A1 | 7/2008 | Beyer-Meklenburg et al. |
| 2013/0233928 A1* | 9/2013 | Ghisa ................ B42D 25/46 235/488 |
| 2014/0265295 A1 | 9/2014 | Rhyner et al. |

FOREIGN PATENT DOCUMENTS

| | | |
|---|---|---|
| CN | 101128327 A | 2/2008 |
| CN | 101228036 A | 7/2008 |
| CN | 102481754 A | 5/2012 |
| CN | 105473342 A | 4/2016 |
| CN | 111344153 A | 6/2020 |
| JP | 2018187839 A * | 11/2018 |
| WO | WO-2015027971 A2 | 3/2015 |
| WO | WO-2019076863 A1 | 4/2019 |

OTHER PUBLICATIONS

"European Application Serial No. 17196931.4, Extended European Search Report dated May 3, 2018", 7 pgs.
"International Application Serial No. PCT/EP2018/078188, International Search Report dated Dec. 20, 2018", 3 pgs.
"International Application Serial No. PCT/EP2018/078188, Written Opinion dated Dec. 2018", 5 pgs.
"Chinese Application Serial No. 201880070438.3, Office Action dated Dec. 23, 2020", w/ English Translation, 13 pgs.

* cited by examiner

INLET SHEET FOR A BOOK-LIKE ELECTRONIC IDENTIFICATION DOCUMENT

CROSS-REFERENCE TO RELATED APPLICATION(S)

This is a National Stage Entry application of International PCT Patent Application No. PCT/EP2018/078188, filed on Oct. 16, 2018, which claims priority to European patent application no. 17196931.4, filed Oct. 17, 2017, each of which is hereby incorporated by reference herein in its entirety.

TECHNICAL FIELD

The present disclosure generally relates to an inlet sheet configured to be used in a book-like electronic identification document, in particular, to an inlet sheet comprising an integrated hinge section. Furthermore, the present disclosure refers to a method for manufacturing an inlet sheet of the above-identified type.

BACKGROUND

Generally, security articles, such as security documents and identification documents, shall be improved continuously, particularly their security shall ensure that counterfeiters cannot produce counterfeit security articles on the basis of genuine security articles. Examples of identification documents having more than one inlet sheet or page include, but are not limited to, passports, drivers' licenses, national ID cards, border crossing cards, security clearance badges, security cards, visas, immigration documentation and cards, gun permits, membership cards, phone cards, stored value cards, employee badges, debit cards, credit cards, and gift certificates and cards.

But as soon as security articles of the above-identified type include more than one page, also the connection of the plurality of pages of such an electronic identification document might be problematic. In such a case we are talking about a type of booklet, for example a passport datapage as part of a multi-page passport. A passport datapage conventionally comprises two sections. A datapage section and a hinge section which protrudes from the datapage section.

For example, WO 2017/032827 A1 shows a book-like identification document including several inlet sheets or pages. Here, the identification document comprises a book front cover and a book back cover and one or more data pages enclosed therein. A personalization datapage disclosed may comprise at least two plastic material outer layers, which have been bonded to each other. The plastic material may be polycarbonate. A further inner layer might be provided, for example made of paper. This inner layer contains the personalization data and a picture as well as OCR machine readable data. Furthermore, a transponder module might be provided between the two outer layers. This multi-layer data page might be sewed in a hinge section. But due to the multi-layer hinge section, its flexibility might be problematic.

Another inlet sheet for a book-like identification document is known from EP 1 663 667 B1. The known inlay sheet for a book-like identification document has a hinge area, which can be joined to the other parts of the book with a seam along one side in the hinge area. It comprises at least one layer of a thermoplastic elastomer and at least one additional layer. The at least one additional layer extends in the direction of the inlay sheet plane essentially from the side opposite the hinge area up to the hinge area. The at least one layer of a thermoplastic elastomer extends into the hinge area. A transponder coil is embedded outside the hinge area in at least one of the at least one layers of thermoplastic elastomer.

US 2014/0265295 A1 refers to an article including a biodata page. The page may define a perimeter including an edge and a hinge layer attached to at least a portion of the biodata page. The hinge layer may comprise a cross-linked polyurethane. In some examples, the hinge layer may include a cross-linked thermoset polyurethane.

US 2012/0164419 A1 shows a multilayer laser-markable sheet for an electronic passport including three sheets. A first sheet includes a transparent polycarbonate resin composition including a thermoplastic polycarbonate resin and a laser light energy absorbing agent. A second multilayer sheet includes a transparent thermoplastic resin including a thermoplastic polycarbonate resin. At least one layer of the skin layers and the core layer of the second multilayer sheet includes at least one selected from a dye and a pigment. A third sheet may include laminate sheet. The multilayer laser-markable sheet for an electronic passport may an excellent laser markability and high contrast.

US 2008/0169638 A1 relates to a personal document in the form of a book, comprising a book cover, a multi-layered personalized side which contains personalised data, in addition to inner pages. The personalised side and the inner pages are secured by means of a seam to the book cover. The multi-layered personalizing side is provided with a central area which is made of a textile layer which is joined on both sides to a thermoplastic layer as a bonding agent which covers the central area until the projecting end forming a hinge area. The bonding agent may has a reactive resin or a partially reactive resin mixture that permanently joins the textile layer and the plastic layers covering the central layer made of, for example, a mesh. A RFID element comprising an IC element is integrated into the central area for the contactless transfer of biometric data of the personal document owner. The personalized side is sewn by means of a seam in the region of the projecting end.

WO 2015/027971 A1 relates to a datasheet for inserting into a preferably book-like security and/or valuable document, The datasheet consists of at least two stacked layers of an organic polymer material, where a paper material layer is arranged at least in a subarea between the layers and outside the layers, forming a tab as a hinge. The paper material layer is coated and/or imbued on one side or both sides at least partially with an organic binder, at least in the area between the layers of organic polymer material, and is bonded to the two layers by means of the binder.

The firm "gemalto" offers a datapage portfolio including datapages with different thicknesses made, for example, from polycarbonate. The datapage may provide a high flexible binding for user convenience and fused datapage hinges for document robustness.

The present disclosure is directed, at least in part, to improving or overcoming one or more aspects of prior systems.

SUMMARY OF THE DISCLOSURE

According to one aspect of the present disclosure, an inlay sheet configured to be used in a book-like identification document, comprises a first hinge layer consisting of polycarbonate and a second hinge layer consisting of a flexible material different to polycarbonate, e.g. PET, polyurethane, fabric, mesh. The second hinge layer is attached to the first hinge layer. A first datapage layer forming a part of a datapage and a second datapage layer forming an opposite part of the datapage are attached to the first hinge layer and the second hinge layer, respectively, such that the first and second hinge layers are positioned between the first and second datapage layers for forming a datapage section. The datapage section has a datapage thickness and the first and second datapage layers form a datapage inner front edge. The first and second hinge layers extend beyond the datapage inner front edge such that a hinge section is formed having a hinge thickness smaller than the datapage thickness.

According to an exemplary embodiment of the present disclosure the pure polycarbonate datapage layers either side of the hinge layers are themselves made up of several layers of different types of polycarbonate in an appropriate sequence in order to achieve various desired properties such as printing, laser engraving, transparency, opacity, embedding of devices and enabling of other security features. For example, a datapage layer comprising a clear laserable overlay over a printed clear laserable layer with a white core layer underneath could be used on one side of the hinge layer. The other datapage layer, i.e. the other side of the hinge layer, could be a white printed core layer with a clear overlay.

Examples of different types of polycarbonate that would typically be used as datapage layers in a passport datapage are white, clear, clear laserable, duplex or superlaserable.

According to another aspect of the present disclosure, a method for manufacturing an inlay sheet may comprise the step of providing a first hinge layer consisting of polycarbonate and providing a second hinge layer consisting of a flexible material different to polycarbonate, e.g. PET, polyurethane, fabric, mesh. Furthermore, the method my comprise the steps of providing a first datapage layer forming a part of a datapage section and providing a second datapage layer forming another part or opposite part of a datapage section. By bonding together the first and second hinge layers and the first and second datapage layers such that the first and second hinge layers are positioned between the first and second datapage layers and the first and second hinge layers extend beyond a datapage inner front edge a hinge section having a hinge section thickness smaller than a datapage section thickness is formed.

Typical polycarbonate lamination process temperatures are, for example, 160°–200° C. Parameters such as pressure and time can vary greatly depending on the specific product and laminator.

Other features and aspects of the present disclosure will be apparent from the following description and the accompanying drawings.

DETAILED DESCRIPTION

Figure 1:
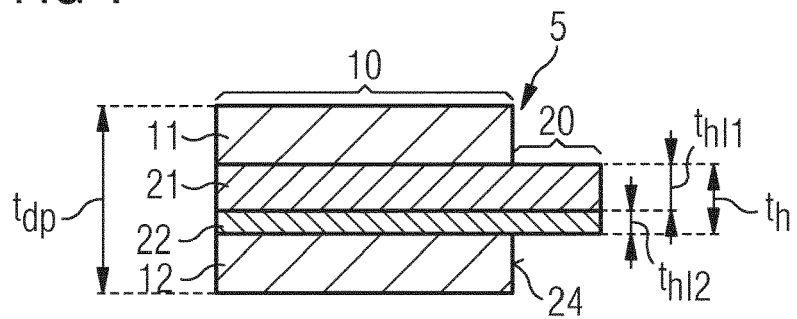
FIG. 1 is a schematic sectional view of a first exemplary embodiment of an inlay sheet according to the present disclosure.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that, at present, all hinge layers of the multilayer hinge section extend into and through the whole datapage section and, accordingly, is a complete layer running through the datapage section. The hinge section is provided as a multi-layer structure that may provide additional durability and flexibility at the hinge and provides, for example, a supporting external layer on one side, both sides, or as a supporting internal layer in the hinge. By adding a flexible hinge layer to the polycarbonate hinge layer, the hinge section may retain the advantages of the polycarbonate such as suitability for printing, laser engraving and lamination stability, while also taking on the properties of the flexible hinge layer such as flexibility, tear resistance, durability, crack prevention, and strength.

According to an exemplary embodiment of an inlay sheet, at least the first and second hinge layers may form a front edge closed by a polycarbonate strip. The polycarbonate strip may be formed during lamination or a similar process of the multilayer hinge composition. Particularly, the open edge shall be preferably closed to avoid that any humidity can enter into the multilayer structure.

According to another exemplary embodiment of the present disclosure, the individual layers may be bonded together by either lamination, welding, adhesives, or another process well known in the art.

In accordance with another exemplary embodiment of the present disclosure, at least one of the first and second datapage layers may include a defined surface pattern formed, for example, by a plurality of voids and/or cavities. Accordingly, voids and/or cavities may be introduced in the polycarbonate layers. Then, by using a flexible hinge material like thermoplastic polyurethane (TPU) that is more viscous than polycarbonate during lamination, it would flow and fill in the voids or cavities in the polycarbonate. This might have multiple benefits like increasing adhesion to the polycarbonate and enhancing the flexibility of the multilayer hinge. Furthermore, continuous patterns like text, maps, symbols or other outlined shapes and/or with the voids or cavities in both the protruding hinge section and in the datapage section could function as a security feature by visually revealing proof of tampering.

Another exemplary embodiment of an inlay sheet is such that the content of polycarbonate in the flexible hinge section can be varied depending on product requirements. Further treatments of the hinge section could enable much higher polycarbonate content in the hinge section with further benefits.

Typical compositions that may work without any additional treatments could be provided by a hinge inner layer made from a material different to polycarbonate with an inner hinge layer thickness of 240 to 250 μm at maximum and a flexible polycarbonate hinge layer with a layer thickness of 30 μm of polycarbonate on both sides. Alternatively, a hinge inner layer made from a material different to polycarbonate with a hinge inner layer thickness of 250 μm at maximum may be provided with a flexible polycarbonate hinge layer with a layer thickness of 50 μm of polycarbonate on one side only. Accordingly, a multilayer hinge section with a nominal thickness of less than 300 μm after lamination would be created. In general, the overall thickness of the multilayer hinge after lamination may be kept to a minimum in order to minimize the impact of the hinge on the opening and closing of, for example, a passport booklet.

The inlet sheet may be structured that the total datapage thickness is smaller than 600 μm and/or the hinge thickness is smaller than 300 μm. Alternatively or additionally, the respective datapage thickness of the first and second datapage layers may be smaller than 300 μm and/or the respective hinge layer thickness of the first and third hinge layers is smaller than 100 μm, particularly smaller than 40 μm.

According to the present disclosure, a multilayer hinge layer as disclosed could also provide some of the datapage functionality and benefits normally provided by the material in the datapage section itself, for example, opacity, laser reflection, laser engraving, security printing, clear window. Various grades of polycarbonate could be used for the datapage layers, such as laserable, superlaserable, clear or white, all offering different visual and performance benefits. This would contribute to achieving all the functionality expected from a passport datapage in a thinner construction with less layers.

In addition, according to another exemplary embodiment of an inlay sheet according to the present disclosure, at least parts of an RFID electronic might be provided in an inner end or outer hinge layer or datapage layer in the datapage section of the inlay sheet disclosed therein.

First Exemplary Embodiment

Referring now to the drawings, FIG. 1 shows a schematic cross-section of a first exemplary embodiment of an inlay sheet 5 according to the present disclosure. Here, the inlay sheet 5 may comprise a first hinge layer 21 and a second hinge layer 22. The first hinge layer 21 may be made of polycarbonate. The second hinge layer 22 bonded to the first hinge layer 21 may consist of a flexible material different to polycarbonate. This material may comprise, for example, PET, polyurethane, fabric or mesh or a combination of these materials.

A first datapage layer 11 and a second datapage layer 12 enclose the first and second hinge layers 21, 22. The first datapage layer 11 and the second datapage layer 12 may be made of any suitable materials known in the art, for example, polycarbonate.

The two outer datapage layers 11, 12 form a front edge 24. The hinge layers 21, 22 extend beyond the front edge 24 and form a hinge section 20. These parts of the hinge layers 21, 22 not extending beyond the front edge 24 may be part of a datapage section 10 of the inlay sheet 5.

As can be seen from FIG. 1, the datapage section 10 has a thickness tdp larger than the thickness th of the hinge section 20. The hinge section 20 has a hinge thickness th formed by the two hinge layers thickness thl1 and thl2. Accordingly, the flexibility of the hinge section might be increased, but the flexibility and durability of the hinge section might be improved.

Second Exemplary Embodiment

Figure 2:
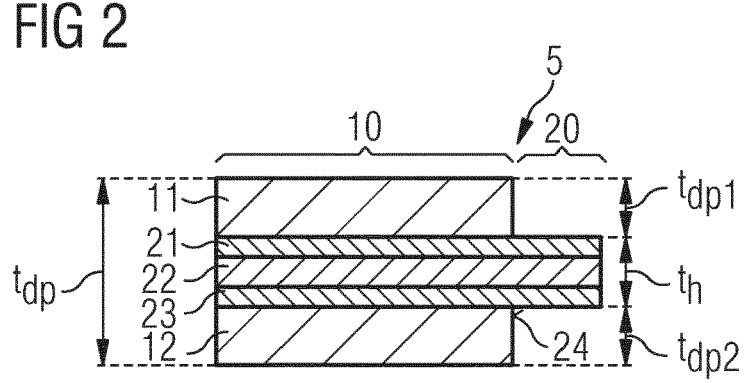
FIG. 2 is a schematic sectional view of a second exemplary embodiment of an inlay sheet according to the present disclosure.

Referring now to FIG. 2, a second exemplary embodiment of an inlet sheet according to the present disclosure is described. FIG. 2 shows a schematic sectional view of an inlay sheet 5 corresponding to the inlet sheet shown in FIG. 1, but comprising three hinge layers 21, 22, 23 instead of two hinge layers 21, 22. Here, the inlay sheet 5 may comprise a first hinge layer 21, a second hinge layer 22 and a third hinge layer 23. The inner or second hinge layer 22 may consist of polycarbonate. The first and third hinge layers 21, 23 both bonded to the first hinge layer 21 may consist of a flexible material different to polycarbonate, for example, PET, polyurethane, fabric or mesh. A first datapage layer 11 and a second datapage layer 12 enclose the first, second and third hinge layers 21, 22, 23 and being bonded to the first and third layers 21, 23, respectively. As in the first embodiment, the first datapage layer 11 and the second datapage layer 12 may be made of polycarbonate.

Again, the two outer datapage layers 11, 12 form a common front edge 24. The hinge layers 21, 22, 23 extend beyond the common front edge 24 and form a hinge section 20. These parts of the hinge layers 21, 22, 23 not extending beyond the front edge 24 may be part of a datapage section 10 of the inlay sheet 5.

Here, as can be seen from the schematic sectional view of the inlet sheet 5 shown in FIG. 2, the datapage section 10 has a thickness tdp larger than the thickness th of the hinge section 20. The outer hinge layers 21, 23 may have a layer thickness thl1, thl3 both being smaller than the layer thickness thl2 of the hinge inner layer 22. Accordingly, the flexibility of the hinge section might be increased, but the flexibility and durability of the hinge section might be improved.

Third Exemplary Embodiment

Figure 3:
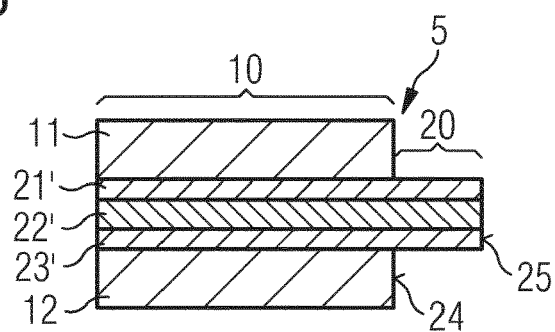
FIG. 3 is a schematic sectional view of a third exemplary embodiment of an inlay sheet according to the present disclosure.

Referring now to FIG. 3, a third exemplary embodiment of an inlet sheet according to the present disclosure is described. FIG. 3 shows a similar schematic sectional view of an inlay sheet 5 as FIG. 2, but the materials of the three hinge layers 21, 22, 23 are different to the embodiment of FIG. 2. Here, the inlay sheet 5 may comprise a first hinge layer 21', a second hinge layer 22' and a third hinge layer 23'. The inner or second hinge layer 22' may be made of a flexible material different to polycarbonate, for example, PET, polyurethane, fabric or mesh. The first and third hinge layers 221, 23 both bonded to the first hinge layer 21 may consist of polycarbonate. Again, first datapage layer 11 and second datapage layer 12 enclose the first, second and third hinge layers 21', 22', 23' and being bonded to the first and third layers 21', 23', respectively. As in the first and second embodiments, the first datapage layer 11 and the second datapage layer 12 may be made of or comprise polycarbonate.

Again, the two outer datapage layers 11, 12 form a common front edge 24. The hinge layers 21', 22', 23' extend beyond the common front edge 24 and form a hinge section 20. These parts of the hinge layers 21', 22', 23' not extending beyond the front edge 24 may be part of a datapage section 10 of the inlay sheet 5. The datapage section 10 has a thickness tdp larger than the thickness th of the hinge section 20. The outer hinge layers 21', 23' may have a layer thickness thl1, thl3 both being smaller than the layer thickness thl2 of the hinge inner layer 22'. Accordingly, the flexibility of the hinge section might be increased, but the flexibility and durability of the hinge section might be improved.

Modified Third Exemplary Embodiment

Figure 4A:
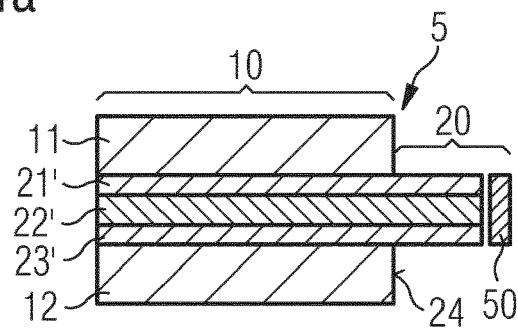
FIG. 4a is a schematic sectional view of the embodiment shown in FIG. 3, but modified at the hinge section.

Referring now to FIG. 4a, a modified third exemplary embodiment of an inlet sheet according to the present disclosure is described. FIG. 4a shows a similar schematic sectional view of an inlay sheet 5 as FIG. 3, but a polycarbonate strip 50 is provided sealing the front edge of the hinge section 20. The strip 50 may be bonded to the front edge.

Figure 4B:
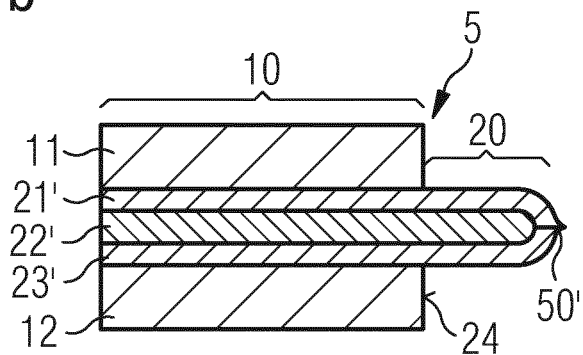
FIG. 4b is a schematic sectional view of the embodiment shown in FIG. 3, but modified at the hinge section.

Alternatively, the strip 50 may be formed during the lamination process of the layers 21', 23' as shown in FIG. 4b at 50'. Here, the hinge layers 21', 23' made of polycarbonate are pressed or squeezed together during lamination to seal in the material of the inner hinge layer 22', for example, polyurethane.

Fourth Exemplary Embodiment

Figure 5:
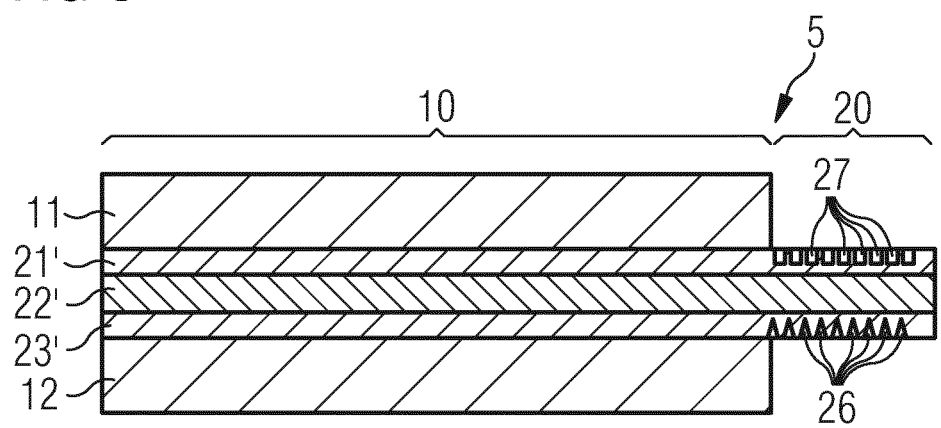
FIG. 5 is a schematic view of the fourth exemplary embodiment similar to that shown in FIG. 3, but modified at the hinge section.

Referring now to FIG. 5, a fourth exemplary embodiment of an inlet sheet 5 according to the present disclosure is described. FIG. 5 shows a similar schematic sectional view of an inlay sheet 5 as FIG. 3, but patterns comprising voids and/or cavities 26, 27 are provided in the hinge section 20 on the outer hinge layers 21' and 23' within the polycarbonate material. Of course, a polycarbonate strip 50, 50' as shown in FIGS. 4a and 4b may also be provided in the embodiment of FIG. 5.

Modified Fourth Exemplary Embodiment

Figure 6:
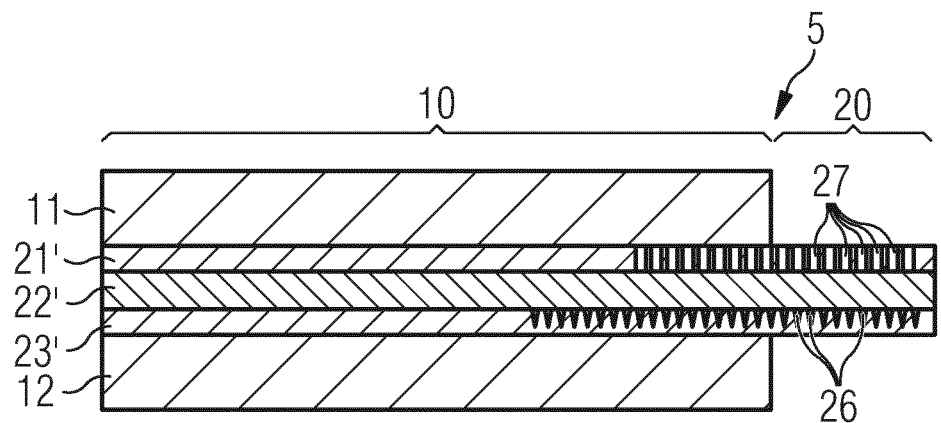
FIG. 6 is a schematic sectional view of the exemplary embodiment shown in FIG. 5, but further modified in the datapage section.

Referring now to FIG. 6, a modified fourth exemplary embodiment of an inlet sheet 5 according to the present disclosure is described. FIG. 6 shows a similar schematic sectional view of an inlay sheet 5 as FIG. 5, but the patterns comprising voids and/or cavities 26, 27 are provided not only in the hinge section 20 but extend into the datapage section 10. Of course, a polycarbonate strip 50, 50' as shown in FIGS. 4a and 4b may also be provided in the embodiment of FIG. 6.

Fifth Exemplary Embodiment

Figure 7:
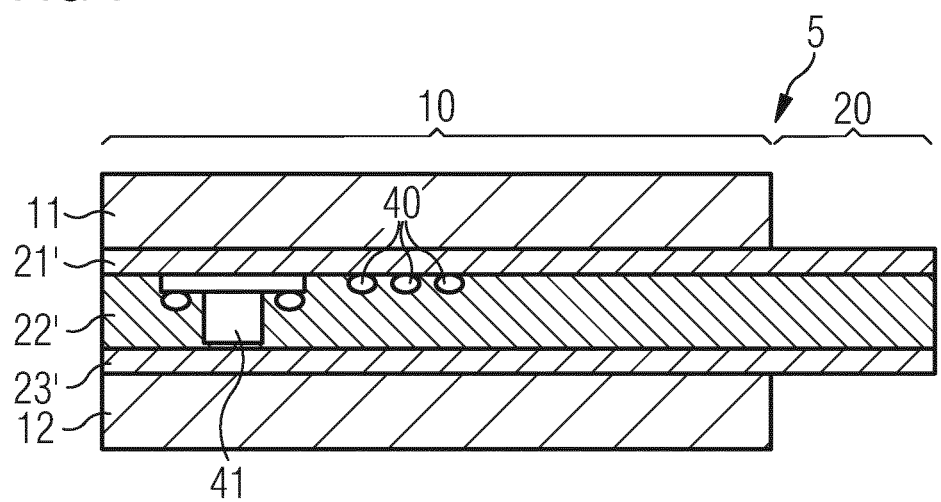
FIG. 7 is a schematic sectional view of a fifth embodiment of an inlay sheet according to the present disclosure.

Referring now to FIG. 7, a fifth exemplary embodiment of an inlet sheet 5 according to the present disclosure is described. FIG. 7 shows a similar schematic sectional view of an inlay sheet 5 as FIG. 3, but at least parts 40, 41 of an RFID are embedded in at least the inner hinge layer 22' in the area being part of the datapage section 20. Of course, a polycarbonate strip 50, 50' as shown in FIGS. 4a and 4b may also be provided in the embodiment of FIG. 7.

Figure 8:
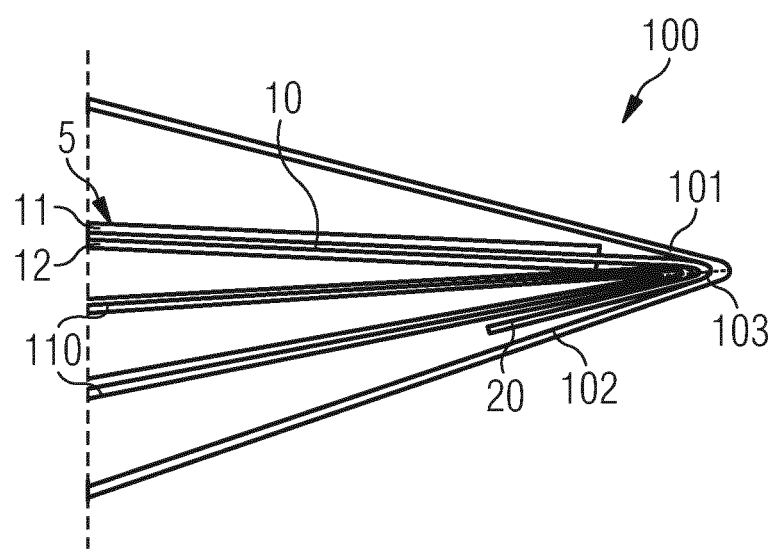
FIG. 8 is a schematic sectional view of an electronic document comprising at least one inlay sheet according to the present disclosure.

Finally, FIG. 8 shows an electronic document 100 comprising a cover 101, 102 enclosing a plurality of inlet sheets 5. All inlet sheets 5 are stitched at 103 within the hinge area 20 into the cover 101, 102 forming a booklet. It has to be noted that the inlet sheets 5 may not comprise one datapage section 10 and one hinge section 20 only, but an inlet sheet 5 may be formed such that the hinge layers 21, 22 or 21', 22', 23' may extend such that two datapage sections 10 are formed with one common hinge section 20 between the two datapage sections 10 provided on opposite sides of the hinge section 20 (seen in a sectional view).

According to an exemplary embodiment of the present disclosure a method for manufacturing an inlay sheet may comprise the steps of providing a first hinge layer 21; 21' consisting of polycarbonate and providing a second hinge layer 22; 22' consisting of a flexible material different to polycarbonate, e.g. PET, polyurethane, fabric, mesh. Furthermore, a first datapage layer 11 and a second datapage layer 12 are being provided. Additionally, the first and second hinge layers 21, 22; 21', 22' and the first and second datapage layers 10, 11 are being bonded together such that the first and second hinge layers 21, 22; 21', 22' are positioned between the first and second datapage layers 11, 12 and the first and second hinge layers 21, 22; 21', 22' extend beyond a datapage inner front edge 24. As already mentioned, typical polycarbonate lamination process temperatures are, for example, 160°–200° C. Parameters such as pressure and time can vary greatly depending on the specific product and laminator. Accordingly, a hinge section 20 having a hinge section thickness th smaller than a datapage section thickness tdp is formed.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. An inlay sheet configured to be used in a book-like identification document, the inlay sheet comprising:
   a first hinge layer comprising polycarbonate;
   a second hinge layer comprising a flexible material different to polycarbonate, the second hinge layer being attached to the first hinge layer;
   a first datapage layer; and
   a second datapage layer;
   wherein the first datapage layer and the second datapage layer are attached to the first hinge layer and the second hinge layer, respectively, such that the first and second hinge layers are positioned between the first and second datapage layers forming a datapage section having a datapage thickness (tdp), the first and second datapage layers forming a datapage inner front edge;
   wherein the first and second hinge layers extend beyond the datapage inner front edge such that a hinge section is formed having a hinge thickness (th) smaller than the datapage thickness (tdp); and wherein the first hinge layer includes a surface pattern comprising a plurality of at least one of voids or cavities, and the plurality of at least one of voids or cavities are filled with material of the second hinge layer.

2. The inlay sheet of claim 1, further comprising:
a third hinge layer comprising polycarbonate, the second hinge layer being positioned between and attached to the first and third hinge layers.

3. The inlay sheet of claim 2, wherein the first, second, and third hinge layers form a common front edge closed by at least one of a polycarbonate strip or a strip formed during lamination of the hinge layers made of polycarbonate by at least one of pressing or squeezing.

4. The inlay sheet of claim 2, wherein the third hinge layer includes another surface pattern.

5. The inlay sheet of claim 4, wherein the another surface pattern comprises a plurality of at least one of voids or cavities.

6. The inlay sheet of claim 5, wherein the plurality of at least one of voids or cavities of the another surface pattern are filled with material of the second hinge layer.

7. The inlay sheet of claim 2, wherein at least one of:
the hinge thickness (th) is at least 30% smaller than the datapage thickness (tdp); or
a hinge layer thickness (thl) of at least one of the first or third hinge layers is at least 80% smaller than a datapage layer thickness (tpl) of at least one of the first or second datapage layers.

8. The inlay sheet of claim 2, herein at least one of:
the datapage thickness (tdp) is smaller than 600 μm;
the hinge thickness (th) is smaller than 300 μm;
respective datapage thicknesses (tdp1, tdp2) of the first and second datapage ers are smaller than 300 μm; or
respective hinge layer thicknesses (thl) of the first and third hinge layers are smaller t 100 μm.

9. The inlay sheet of claim 1, wherein the surface pattern extends at least partly in the hinge section.

10. The inlay sheet of claim 1, wherein at least a component of an RFID element is positioned in the second hinge layer.

11. The inlay sheet of claim 10, wherein the component extends at least in part in the datapage section.

12. The inlay sheet of claim 1, wherein at least one printed or laser engraved pattern is provided in the hinge section.

13. The inlay sheet of claim 1, wherein a hinge layer thickness (thl2) of the first hinge layer is at least 80% smaller than a hinge layer thickness (thl1) of the second hinge layer.

14. A method for manufacturing an inlay sheet, the method comprising:
providing a first hinge layer comprising polycarbonate;
providing a second hinge layer comprising a flexible material different to polycarbonate;
generating a defined pattern comprising a plurality of at least one of voids or cavities in the first hinge laver;
filling the plurality of at least one of voids or cavities with material of the second hinge layer during bonding of the first and second hinge layers;
providing a first datapage layer forming a part of a datapage section;
providing a second datapage layer forming another part of the datapage section; and
bonding together the first and second hinge layers and the first and second datapage layers such that the first and second hinge layers are positioned between the first and second datapage layers and the first and second hinge layers extend beyond a datapage inner front edge, forming a hinge section having a hinge section thickness (th) smaller than a datapage section thickness (tdp).

15. The method of claim 14, further comprising:
providing a third hinge layer comprising polycarbonate;
positioning the second hinge layer between the first and third hinge layers; and
bonding the first, second and third hinge layers to each other.

16. The method of claim 15, further comprising
generating another defined pattern comprising a plurality of at least one of voids or cavities in the third hinge layer; and
filling the plurality of at least one of voids or cavities of the another defined pattern with material of the second hinge layer during bonding of the first, second and third hinge layers.

* * * * *